April 30, 1940.  K. SCHWAIGER  2,198,979
ANTECHAMBER DIESEL ENGINE WITH READJUSTABLE CONTROL BODY
Filed Dec. 30, 1936  2 Sheets-Sheet 1
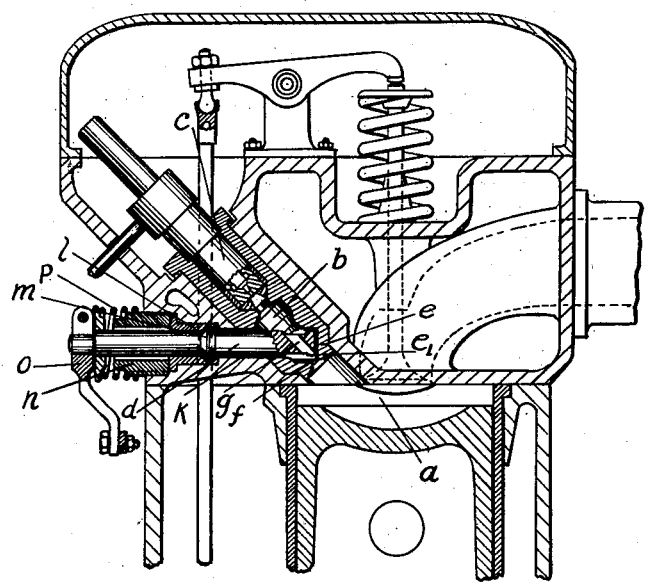
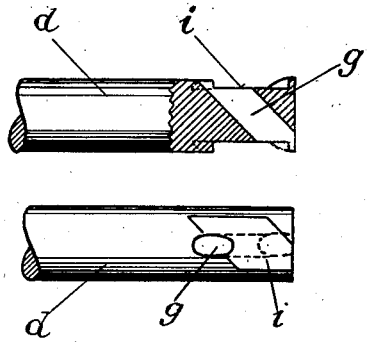
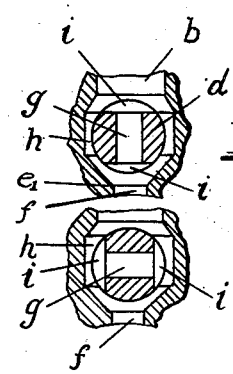
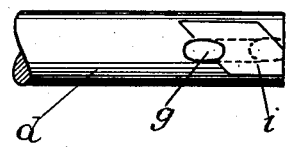
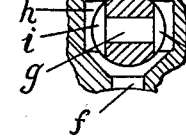
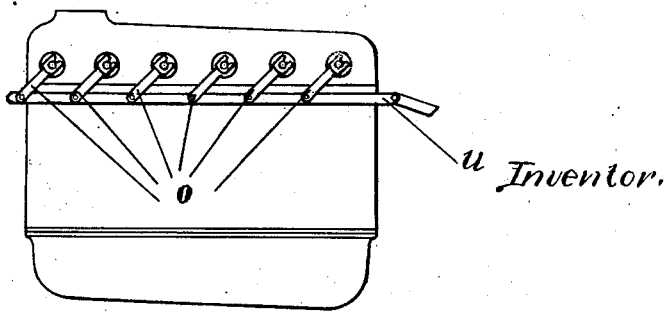
Inventor.
Karl Schwaiger April 30, 1940.   K. SCHWAIGER   2,198,979
ANTECHAMBER DIESEL ENGINE WITH READJUSTABLE CONTROL BODY
Filed Dec. 30, 1936   2 Sheets-Sheet 2

Inventor,
Karl Schwaiger

Patented Apr. 30, 1940

2,198,979

UNITED STATES PATENT OFFICE 2,198,979

ANTECHAMBER DIESEL ENGINE WITH READJUSTABLE CONTROL BODY

Karl Schwaiger, Gaggenau/Baden, Germany, assignor to Daimler-Benz Aktiengesellschaft, Stuttgart-Untertürkheim, Germany Application December 30, 1936, Serial No. 118,311
In Germany January 3, 1936

23 Claims. (Cl. 123—32)

This invention relates to a precombustion or antechamber Diesel engine, in which the fuel is injected in a known manner into an antechamber communicating with the main combustion space by means of a throttling device formed, for example, by a plurality of narrow channels or passages or the like. It has been found that starting an engine of this type is difficult when the engine is still in a cold state. In order to overcome the difficulty mentioned it has already been proposed to provide the engine with a rotary shutting-off member which renders it possible to inject the fuel through the antechamber directly into the main combustion space through an otherwise closed aperture. In this construction the shutting-off member is subjected directly to the hot gases of the main combustion space and it is, besides, so supported that actuating it can be easily rendered impossible owing to seizing of said member due to expansion from heat. It has also been proposed to disconnect a portion of the antechamber from the other portion thereof in order to facilitate the starting, but there are in this construction large surfaces which are unfavorable for the proper operation of the engine.

All drawbacks hinted at in the preceding paragraph are overcome by the present invention, the chief characteristic feature of which is that as the member for shutting-off the antechamber from the main combustion space a throttling member is provided which extends freely into the antechamber and is preferably supported in the cylinder only at a substantial distance from said chamber. Owing to this arrangement, surfaces sliding upon one another within the antechamber and serving for supporting the throttling body are unnecessary. In connection with the screening of the throttling body relatively to the main combustion space an arrangement is obtained in which seizing of said body or destruction thereof is practically completely excluded.

It is suited to the purpose in view to insert the throttling body in lieu of the normal spark plug so that every engine which is normally equipped with a spark plug can be provided in a simple manner with the throttling body mentioned.

Varying the sectional area of the throttling body can be effected either by turning this body or by shifting it or by doing both, in which latter case the throttling body is completely removed from the fuel jet whereby an entirely unimpeded spurting of the fuel into the main combustion chamber can be obtained.

The invention is illustrated diagrammatically and by way of example on the accompanying drawings on which:

Figure 1 is a transverse section through the cylinder of a precombustion chamber Diesel-engine designed according to this invention;

Figure 2 is a side view of the throttling body drawn to an enlarged scale;

Figure 3 is a transverse section through the throttling body shown in Fig. 2;

Figure 4 is a view similar to Fig. 2, showing the same throttling body turned by 90 degrees;

Figure 5 is a transverse view corresponding to Fig. 4;

Figure 8 is a side view of a multi-cylinder engine in which all throttling bodies pertaining to the several cylinders can be actuated at the same time.

Figure 6:
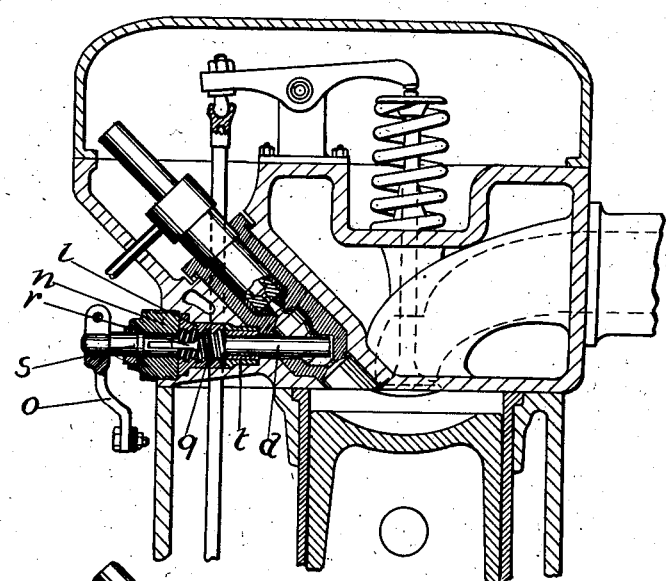
Figure 6 is a view similar to Fig. 1 and shows a modified structure.

Referring to Fig. 1, $a$ denotes the main combustion space, $b$ the antechamber, $c$ the injection nozzle, $d$ the readjustable throttling body, and $e$ an inserted member which encloses the precombustion chamber and screens it by means of the inwardly projecting collar $e_1$, and leaves open only a middle throttling aperture $f$ located between the precombustion chamber and the main combustion space. The precombustion chamber $b$ is oblique and arranged eccentrically relatively to the cylinder axis, whereas the throttling body $d$ is inserted, in lieu of the usual spark plug, laterally into the cylinder head in horizontal position and extends freely into the precombustion chamber in such a manner that its end is located in front of the throttling aperture $f$ within the fuel jet coming from the nozzle $c$.

In the proximity of the precombustion chamber the throttling body is located in the bore in the cylinder head with a certain amount of play indicated at $k$ and is supported in a sleeve $l$ only at some distance from the precombustion chamber; said sleeve is retained in its place in the cylinder head by suitable means such as a nut $n$. For securing the throttling body $d$ in its place in an axial direction this body is shown provided with a collar $m$ which bears on the sleeve $l$ under the pressure of a helical compression spring $p$. For the readjustment of the throttling body a lever $o$ is provided which is affixed to the outer end of said body and may turn it by about 90 degrees.

In Figs. 1-3 the throttling body is shown in the position it assumes when the engine is in the starting or cold state. In this position a middle bore $g$ is provided in the throttling body in an axial position relatively to the precombustion chamber, viz., in such a position that the fuel jet coming from the nozzle $c$ is injected directly into the main combustion space through the precombustion chamber $b$, the bore $g$, and the throttling aperture $f$.

In Figs. 4 and 5 the throttling body is shown in its normal working position in which it is turned by 90 degrees relatively to the position shown in Figs. 2 and 3. From Figs. 4 and 5 appears that the throttling body has flattened portions $i$ located substantially perpendicularly with respect to the middle bore $g$ so that when the throttling body is turned from the position Figs. 2 and 3 into the position Figs. 4 and 5 they present passages with a larger sectional area, whereas the central passage otherwise communicating with the throttling aperture $f$ and serving then for the passage of the fuel is closed. The flattened portions $i$ coact now with the passage $h$ surrounding the throttling body, in such a manner, that they enlarge the sectional area of the same, as will appear from a comparison of the Fig. 3 with the Fig. 5. The passage may be chosen according to the existing conditions and may eventually be so narrow that when the members concerned are in their starting position a communication between the precombustion chamber and the main combustion space exists practically solely across the middle bore $g$. Instead of the single flattened portions $i$ a plurality of recesses or subdivided channels may be provided.

Figure 7:
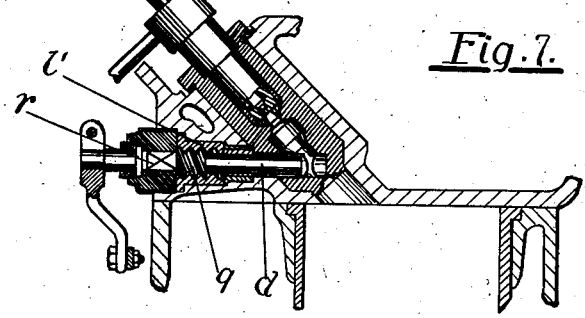
Figure 7 shows the same elements as Fig. 6, but the throttling body is shown in a readjusted position.

In the modification shown in Figs. 6 and 7 the throttling body $d$ is inserted into a threaded nut $l'$ by means of a packing $t$, and means are provided for preventing said nut from turning in the cylinder head. A key $r$ couples the throttling body with the shaft $s$ of the lever $o$, said key engaging a suitable slot in said shaft. When the lever $o$ is turned, the throttling body is not only likewise turned, but also axially shifted into the position Fig. 7 so that in this position it is practically completely withdrawn from the fuel jet and permits, therefore, a free passage of this jet into the main combustion space.

In Figure 8 is illustrated a manner in which a plurality of throttling bodies can be actuated at the same time. For this purpose all readjusting levers $o$ are connected with a common rod $u$ which, for example in the case of motor vehicles, can be actuated either manually from the driver's place or automatically in dependency of the acceleration pedal or of a device regulating the number of revolutions of the engine. It is, anyhow, also possible to provide means for actuating the individual throttling bodies in steps or in groups, or only certain individual cylinders may be provided with such throttling bodies, whereas the other cylinders have a normal precombustion chamber without an adjustable throttling body.

By the present invention the throttling body is prevented from seizing or burning, and the starting conditions, as well as the working conditions are particularly favorable. The engine starts quickly when it is in cold state, without any preliminary heating, and its consumption of fuel is also very economical during the starting period. By changing the throttling body from the position of rest to the working position in which direct injection of the fuel into the main combustion space is prevented and the fuel can enter from the precombustion chamber into the main combustion space only by evading the throttling body, and economical operation of the engine is also attained, in that the consumption of fuel is remarkably small, and additionally, a high medium pressure is attained at normal working of the engine.

While I have herein shown and described only certain embodiments of certain features of my present invention it is to be understood that they are to be regarded merely as illustrative and that I do not intend to limit myself thereto except as may be required by the claims which follow.

I claim:

1. In an internal combustion engine having a main combustion space and a precombustion chamber connected therewith, in combination, an injection nozzle for injecting fuel into said precombustion chamber, an adjustable throttling member between the precombustion chamber and the main combustion space, said member so constructed and arranged as to permit free injection of the fuel therethrough for starting the engine and passage of the fuel during the operation of the engine only through transverse throttling sections, said throttling member extending into the precombustion chamber, and means removed from the hot gases of the main combustion space and mounted outside of said precombustion chamber for the sole support of said throttling member in said precombustion chamber.

2. In an internal combustion engine having a cylinder containing a main combustion space, and a precombustion chamber connected therewith, in combination, an injection nozzle for injecting fuel into said chamber in the axial direction thereof, said nozzle, chamber and cylinder being so relatively positioned that the axis of said nozzle and of the chamber form an acute angle with the axis of the cylinder, an adjustable throttling member between the precombustion chamber and the main combustion space, said member so constructed and arranged as to permit free injection of the fuel therethrough for starting the engine and passage of the fuel during the operation of the engine only through transverse throttling sections, said throttling member extending into the precombustion chamber and being arranged obliquely with respect to the axis of said chamber, and means outside of said precombustion chamber for the sole support of said throttling member.

3. In an internal combustion engine having a cylinder containing a main combustion space and a precombustion chamber connected therewith, in combination, an injection nozzle for injecting fuel into said chamber, said nozzle being so positioned that its axis and the axis of the precombustion chamber form an acute angle relatively to the cylinder axis, an adjustable throttling member between the precombustion chamber and the main combustion space, said member so constructed and arranged as to permit free injection of fuel therethrough for starting the engine and passage of the fuel during the operation of the engine only through transverse throttling sections, said throttling member extending into the precombustion chamber and being positioned substantially perpendicularly with respect to the cylinder axis, and means removed from the hot gases of the main combustion space and mounted outside of said precombustion chamber for the sole support of said throttling member in said precombustion chamber.

4. In an internal combustion engine having a main combustion space and a precombustion chamber connected therewith, in combination, an injection nozzle for injecting fuel into said precombustion chamber, a throttling body adapted to be turned about its axis and extending with a cylindrical portion freely into the precombustion chamber, said cylindrical portion having a middle bore adapted to connect the precombustion chamber with the main combustion space and having in addition recessed flat portions extending at an angle to the axis of said middle bore and alternating therewith, after said body has been appropriately turned, to form channels between the precombustion chamber and the main combustion space.

5. In an internal combustion engine having a cylinder containing a main combustion space, and a precombustion chamber connected therewith, in combination, an injection nozzle for injecting fuel in the axial direction of said precombustion chamber, the axis of said nozzle and of the precombustion chamber forming an acute angle with respect to the cylinder axis, a throttling body located between the precombustion chamber and the main combustion space and being rotatable about its axis and extending with a cylindrical portion freely into the precombustion chamber, said cylindrical portion extending obliquely with respect to the axis of the precombustion chamber and having a middle bore forming in one position of said body a straight channel extending from the precombustion chamber to the main combustion space in the direction of the fuel jet, and having in addition recessed flat portions adapted in another position of said body to form communications about said body between the precombustion chamber and the main combustion space, the said middle bore and the said flat recessed portions extending substantially parallel to the axis of the fuel jet in their respective operating positions.

6. In an internal combustion engine having a main combustion space and a precombustion chamber connected therewith, in combination, an injection nozzle for injecting fuel into the precombustion chamber, a throttling body between the precombustion chamber and the main combustion space, said body being axially shiftable and presenting during operation of said engine only a single narrow aperture between the precombustion chamber and the main combustion space, and for starting said engine completely opening the communication between the precombustion chamber and the main combustion space.

7. In an internal combustion engine having a main combustion space and a precombustion chamber connected therewith, in combination, an injection nozzle for injecting fuel into the precombustion chamber, a throttling body located between the precombustion chamber and the main combustion space and having a threaded portion, means for supporting said body comprising a threaded nut cooperating with the threaded portion of said body and permitting an axial shifting thereof, said body being adapted in one position to present only a narrow aperture between the precombustion chamber and the main combustion space and in another position to permit full communication between the precombustion chamber and the main combustion space.

8. In an internal combustion engine having a cylinder containing a main combustion space and a precombustion chamber connected therewith, in combination, an injection nozzle for injecting fuel into said precombustion chamber, said elements being so positioned that the axis of said nozzle and the axis of the precombustion chamber form an acute angle with the axis of the cylinder, a throttling member positioned obliquely relative to the direction of the fuel jet, means for axially shifting said member, whereby during the running of the engine only a narrow aperture between the precombustion chamber and the main combustion space exists but full communication between the precombustion chamber and the main combustion space is permitted during engine starting.

9. In an internal combustion engine having a precombustion chamber, and a cylinder having a main combustion space connected therewith, in combination, an injection nozzle for injecting fuel into the precombustion chamber, said elements being so positioned that the axis of the nozzle and of the precombustion chamber forms an acute angle with the axis of the cylinder, a throttling body having a threaded portion positioned intermediate the precombustion chamber and the main combustion space, and extending obliquely with respect to the axis of the fuel jet, means for supporting said body and permitting axial shifting of the same comprising a nut adapted to engage the threaded portion of said body, whereby during running of the engine only a narrow aperture between the precombustion chamber and the main combustion space exists, but full communication between said chamber and said space is permitted during engine starting.

10. In an internal combustion engine having a plurality of cylinders, each one of which includes a main combustion space, a precombustion chamber, a fuel injection nozzle, and a throttling member extending freely into said chamber between the chamber and the said space, said throttling member being so constructed and arranged as to form a straight communication in the direction of the fuel jet between the precombustion chamber and the main combustion space during starting of the engine, and narrow passages extending about the throttling member during running of the engine, and common means for simultaneously operating all of the throttling members of the engine.

11. A throttling body adapted to be inserted in a conduit for controlling passage of fluid therethrough, comprising a rotatable member having an end projecting into said conduit at an angle thereto, said projecting end having an opening therethrough adapted in one rotatable position of said throttling body to be coaxial with said conduit, said projecting end also having recessed plane surfaces at the respective ends of the openings, whereby upon a rotation of said throttling body of substantially 90° a restricted opening is presented to said conduit.

12. A throttling body adapted to be inserted into a conduit for controlling passage of fluid therethrough, comprising a threaded rotatable member having an end projecting into said conduit at an angle thereto, and means cooperating with the threads of said rotatable member whereby upon rotation thereof the end of said member can be projected into or withdrawn from said conduit for controlling the passage of fluid.

13. In an internal combustion engine, in combination, a cylinder having a main combustion chamber, a precombustion chamber connected therewith and extending obliquely to said cylinder, an injection nozzle mounted for injecting fuel through said oblique precombustion chamber into said main combustion chamber, and a device extending obliquely into said precombustion chamber for controlling passage of fluid from one chamber to the other, said device having certain passages therethrough extending at an angle to the axis of the throttling device and substantially parallel to the axis of the precombustion chamber.

14. In an injection internal combustion engine having a main combustion space, a precombustion chamber connected therewith through a relatively narrow opening, and an injection nozzle so positioned opposite said opening as to inject fuel into said precombustion chamber in the direction of said opening, in combination with a rod-shaped throttling member extending freely into said precombustion chamber intermediate said nozzle and said opening in the path of the injected fuel, and means for adjusting said throttling member between two extreme positions, said throttling member being so formed that in one extreme position it offers a substantially unobstructed path to the injected fuel stream, while in its other extreme position it substantially prevents said fuel stream from communication with said main combustion space.

15. The combination according to claim 14 in which said adjusting means for said throttling member includes means for rotating said throttling member between said two extreme control positions.

16. The combination according to claim 14, in which said rod-shaped throttling member has a diameter which is only a fraction of the distance between the injection nozzle and the opening connecting the precombustion chamber and the main combustion space, and wherein said throttling member extends into that part of the precombustion chamber adjacent said opening.

17. The combination according to claim 14, in which the precombustion chamber has a side wall having an opening through which the throttling member extends into the chamber, said wall opening being sufficiently large to avoid contact of said throttling member with said wall, and means removed from said precombustion chamber for supporting said throttling member in said precombustion chamber.

18. In an injection internal combustion engine having a main combustion space, a precombustion chamber connected therewith through a relatively narrow opening, and an injection nozzle so positioned opposite said opening as to inject fuel in a straight line into said precombustion chamber in the direction of said opening, the combination of means for controlling the passage of said injected fuel during the starting and running of said engine, comprising a rod-shaped throttling member extending freely into said precombustion chamber intermediate said nozzle and said opening in the path of the injected fuel, and means for adjusting said throttling member between two extreme positions for starting and running, said throttling member having an open section which in the one extreme position for starting lies co-axial with the opening between the precombustion chamber and the main combustion space and in the direction of the fuel stream, and which in its other position for running is positioned as an obstruction to the said opening between the precombustion chamber and the main combustion space so as to prevent a straight-line injection of the fuel into the main combustion space.

19. In an internal combustion engine having a main combustion space, a precombustion chamber connected therewith through a single opening, and an injection nozzle in said precombustion chamber, the combination of adjustable throttling means positioned in that part of the precombustion chamber which is adjacent the opening between said chamber and said main combustion space, and supported solely by means substantially removed from said precombustion chamber and the hot gases in said main combustion space.

20. In an internal combustion engine having a main combustion space, a precombustion chamber connected therewith through a single opening, and an injection nozzle in said precombustion chamber, the combination of adjustable throttling means positioned in that part of the precombustion chamber which is adjacent the opening between said chamber and the main combustion space, said throttling means including a raised annular portion removed from said precombustion chamber, and supporting means substantially removed from said precombustion chamber and the hot gases in said main combustion space, said supporting means including a grooved bearing for receiving said raised annular portion, whereby said throttling means is rotatable but not axially shiftable.

21. In an internal combustion engine having a main combustion space, a precombustion chamber connected therewith through a single opening, and an injection nozzle in said precombustion chamber, the combination of adjustable throttling means having at least two passages perpendicular to one another positioned in that part of the precombustion chamber which is adjacent the opening between said chamber and said main combustion space, one of said passages being so positioned and of such size as to permit in its operating position a substantially greater flow therethrough than the other passage, and means forming the sole support for said adjustable throttling means, substantially removed from said precombustion chamber and the hot gases in said main combustion space.

22. In an internal combustion engine, in combination, a cylinder having a main combustion chamber, a precombustion chamber connected therewith and extending obliquely to said cylinder, an injecting nozzle mounted for injecting fuel through said oblique precombustion into said main combustion chamber, and a throttling device extending obliquely into said precombustion chamber for controlling passage of fluid from one chamber to the other, said device having certain passages therethrough extending at an angle to the axis of the throttling device and substantially parallel to the axis of the precombustion chamber, and other passages extending at an angle to the axis of the throttling device and adapted when in operating position to be co-axial with the axis of the precombustion chamber.

23. In an injection internal combustion engine having a main combustion space, a precombustion chamber connected therewith through a relatively narrow opening, and an injection nozzle so positioned opposite said opening as to inject the fuel into said precombustion chamber in the direction of said opening, in combination with a rod-shaped throttling member extending freely into said precombustion chamber intermediate said nozzle and said opening in the path of the injected fuel, and means for adjusting said throttling member between two extreme control positions, said throttling member being formed with a central opening which, in one extreme control position of said member, is positioned co-axially with said fuel stream, thereby permitting free passage thereof through said member and with laterally displaced cut-out portions, and which in the other extreme position of said member offers to said fuel stream, paths parallel to but outside of the axis of the fuel stream, thereby substantially obstructing said fuel stream from communication with said main combustion space.

KARL SCHWAIGER.